(12) United States Patent
Tanabe

(10) Patent No.: US 9,777,905 B2
(45) Date of Patent: Oct. 3, 2017

(54) REFLECTIVE SHEET, DISPLAY DEVICE AND REFLECTIVE MEMBER

(71) Applicant: Funai Electric Co., Ltd., Osaka (JP)

(72) Inventor: Noritaka Tanabe, Osaka (JP)

(73) Assignee: Funai Electric Co., Ltd., Osaka (JP)

( * ) Notice: Subject to any disclaimer, the term of this patent is extended or adjusted under 35 U.S.C. 154(b) by 207 days.

(21) Appl. No.: 14/671,392

(22) Filed: Mar. 27, 2015

(65) Prior Publication Data

US 2015/0276148 A1    Oct. 1, 2015

(30) Foreign Application Priority Data

Mar. 28, 2014    (JP) .................................. 2014-067717

(51) Int. Cl.
*F21V 7/09*       (2006.01)
*G02F 1/1335*     (2006.01)
*F21V 7/00*       (2006.01)
*F21K 9/62*       (2016.01)

(52) U.S. Cl.
CPC .................. *F21V 7/09* (2013.01); *F21K 9/62* (2016.08); *F21V 7/0066* (2013.01); *G02F 1/133605* (2013.01); *G02F 1/133603* (2013.01)

(58) Field of Classification Search
CPC . F21K 9/62; F21V 7/0066; F21V 7/09; G02F 1/133605; G02F 1/133603
See application file for complete search history.

(56) References Cited

U.S. PATENT DOCUMENTS

2002/0039292 A1*    4/2002    Matsui ..................... F21S 8/00
                                                      362/297
2003/0234896 A1    12/2003    Kim

FOREIGN PATENT DOCUMENTS

WO    2011074366 A1    6/2011

OTHER PUBLICATIONS

Extended European Search Report issued in corresponding European Application No. 15161542.4, mailed on Aug. 3, 2015 (11 pages).

* cited by examiner

*Primary Examiner* — Stephen F Husar
(74) *Attorney, Agent, or Firm* — Osha Liang LLP

(57) ABSTRACT

A reflective sheet includes a bottom portion; a plurality of inclined portions disposed at an incline from a periphery of the bottom portion; and a fold disposed in a predetermined position on the reflective sheet at a predetermined position in a direction orthogonal to a surface of the bottom portion.

17 Claims, 8 Drawing Sheets

REFLECTIVE SHEET, DISPLAY DEVICE AND REFLECTIVE MEMBER

TECHNICAL FIELD

The present invention relates generally to a reflective sheet, a display device including the reflective sheet and a reflective member.

BACKGROUND ART

Conventional display devices are provided with a reflective sheet (for example, see Patent Literature 1).

Disclosed in Patent Literature 1 is a display device, provided with: a light source, a display unit, a reflective sheet that reflects a light from the light source, and a rear frame disposed rearward of the reflective sheet. The reflective sheet includes an inclined portion formed in a nearly-flat, convex curved shape that protrudes forward (light-emission side) a small protrusion amount along an inclination direction. Flexural deformation of the reflective sheet from a forwardly convex state to a rearwardly convex state is suppressed by this inclined portion of the curved shape.

CITATION LIST

Patent Literature

[Patent Literature 1] WO 2011/074366

However, in Patent Literature 1, in a situation such as where due to a manufacturing error or thermal expansion the reflective sheet is formed larger than a predetermined size in a direction in which an edge portion of the rear frame extends or the reflective sheet is thermally expanded, it is conceivable that there will be an inconvenience where flexural deformation cannot be sufficiently suppressed when installing the reflective sheet to the rear frame or the like and flexure arises in the inclined portion of the curved shape. That is, in Patent Literature 1, it is conceivable that sufficiently suppressing flexural deformation in the inclined portion of the reflective sheet is difficult; as a result, there is a problem where brightness unevenness arises in the display unit. In Patent Literature 1, because the inclined portion of the nearly-flat, convex curved shape that extends continuously from a light-source side toward the edge portion of the rear frame and protrudes the small protrusion amount is provided, there is a problem where a light amount arriving on a display-unit side near the edge portion of the rear frame is large and a bright line is more likely to arise near an edge portion of the display unit.

SUMMARY OF THE INVENTION

A display device in accordance with one or more embodiments may further suppress generation of brightness unevenness in a display unit by sufficiently suppressing flexure of a reflective sheet and can suppress generation of a bright line near an edge portion of the display unit.

In one aspect, a display device according to one or more embodiments of the present invention may comprise: a light source; a display unit; a reflective sheet that reflects a light from the light source forward of a display-unit side; and a rear frame that is disposed rearward of the reflective sheet and houses the light source and the reflective sheet; wherein the reflective sheet includes a first inclined portion on an inner side that is a light-source side and a second inclined portion on an outer side of the first inclined portion and is formed in a shape that tapers from the front to the rear by the first inclined portion and the second inclined portion, the first inclined portion and the second inclined portion extend in directions orthogonal to inclination directions of each and are connected by a fold of a mountain shape facing forward, and the reflective sheet is configured so an angle of the first inclined portion rising from the light-source side is greater than an angle of the second inclined portion rising from the light-source side.

The display device according to one or more embodiments of the present invention, as above, by connecting the first inclined portion and the second inclined portion of the reflective sheet by the fold that extends in the direction orthogonal to the inclination directions of each, causes the reflective sheet to become less likely to flex (bend) in a direction orthogonal to the direction in which the fold extends due to the fold; therefore, deformation in the inclined portions of the reflective sheet may be sufficiently suppressed. As a result, generation of brightness unevenness in the display unit may be further suppressed. By configuring the reflective sheet so that the angle of the first inclined portion rising from the light-source side is greater than the angle of the second inclined portion rising from the light-source side, the first inclined portion rises at a greater (steeper) angle than the second inclined portion via the fold; therefore, a light amount arriving on a display-unit side near an edge portion of the rear frame may be reduced compared to a situation of being flat overall where the first inclined portion is made to be the same angle as the second inclined portion or a situation of a nearly-flat curved shape overall. As a result, generation of a bright line near an edge portion of the display unit may be suppressed.

The display device according to one or more embodiments may comprise the reflective sheet that is configured so that a length in the inclination direction of the first inclined portion is smaller than a length in the inclination direction of the second inclined portion. Thus, a distance between the first inclined portion and the edge portion of the display unit may be made large; therefore, it becomes less likely for a light reflected at the first inclined portion to reach the vicinity of the edge portion of the display unit. As a result, generation of the bright line near the edge portion of the display unit may be further suppressed.

The display device according to one or more embodiments, may further comprise an optical sheet disposed forward of the light source and the reflective sheet; wherein the fold is disposed in a front and rear direction on a side closer to the light source than the optical sheet. Thus, a distance in the front and rear direction between the first inclined portion and the optical sheet may be made small; therefore, it becomes less likely for the light reflected at the first inclined portion to reach a vicinity of an edge portion of the optical sheet (display unit). As a result, generation of the bright line near the edge portion of the display unit may be further suppressed.

According to one or more embodiments of the present invention, longitudinal directions of the reflective sheet, the first inclined portion, and the second inclined portion are the same direction as a longitudinal direction of the display unit, and the fold at a boundary between the first inclined portion and the second inclined portion is formed to extend along the longitudinal direction of the display unit. Thus, a rigidity of the first inclined portion and the second inclined portion in the longitudinal direction, in which flexure deformation is particularly likely to arise due to an influence of thermal expansion or the like, may be heightened; therefore, flexure deformation of the first inclined portion and the second inclined portion may be further suppressed.

According to one or more embodiments, both the first inclined portion and the second inclined portion are formed in a flat-surface shape. Thus, the first inclined portion is formed in the flat-surface shape; therefore, a reflection direction and amount of the light may be easily adjusted (controlled at a designing step) by changing a rising angle and a position of the first inclined portion relative to the light source.

According to one or more embodiments, the rear frame is formed in a rectangular shape when viewed from the front and rear direction and includes a first edge portion near which the first inclined portion and the second inclined portion of the reflective sheet are disposed and a second edge portion adjacent to the first edge portion, and the reflective sheet includes a third inclined portion disposed near the second edge portion and is configured so among a boundary line between the first inclined portion and the third inclined portion and a boundary line between the second inclined portion and the third inclined portion, the longer boundary line has the third inclined portion and one from among the first inclined portion and the second inclined portion connected thereon, and the shorter boundary line does not have the third inclined portion and the other from among the first inclined portion and the second inclined portion connected thereon. Thus, the longer boundary line from among the boundary lines between the third inclined portion and the first inclined portion or the second inclined portion may be connected to the third inclined portion; therefore, the third inclined portion and one from among the first inclined portion and the second inclined portion may be connected in a wider range (longer distance). As a result, flexure arising in the reflective sheet may be effectively suppressed.

According to one or more embodiments, the second inclined portion is formed in the flat-surface shape, and the first inclined portion is formed in a curved shape that is forwardly convex and curves along the inclination direction of the first inclined portion. Thus, a first inclined surface near the light source becomes the convex and curved shape; therefore, the light reflected at the first inclined portion may be diffused, and it may be made difficult for the light to arrive near the end portion of the display unit. Thus, brightness unevenness of the display unit may be suppressed, and generation of the bright line near the edge portion of the display unit may be suppressed.

According to one or more embodiments, the second inclined portion is formed in the flat-surface shape, and the first inclined portion is formed in a curved shape that is rearwardly convex and curves along the inclination direction of the first inclined portion. Thus, the first inclined surface near the light source becomes a concave and curved shape; therefore, the light reflected at the first inclined portion may be diffused, and it may be made difficult for the light to arrive near the end portion of the display unit. Thus, brightness unevenness of the display unit may be suppressed, and generation of the bright line near the edge portion of the display unit may be suppressed.

The display device according to one or more embodiments of the present invention may further suppress generation of brightness unevenness in the display unit by sufficiently suppressing flexure of the reflective sheet and may suppress generation of the bright line near the edge portion of the display unit.

A reflective sheet according to one or more embodiments of the present invention may include a bottom portion; a plurality of inclined portions disposed at an incline from a periphery of the bottom portion; and a fold disposed in a predetermined position on the reflective sheet at a predetermined position in a direction orthogonal to a surface of the bottom portion.

A display device according to one or more embodiments of the present invention may include a display unit; a reflective sheet comprising a bottom portion, a plurality of inclined portions disposed at an incline from a periphery of the bottom portion, a fold disposed in a predetermined position on the reflective sheet at a predetermined position in a direction orthogonal to a surface of the bottom portion; and a light source disposed on the bottom portion.

A reflective member according to one or more embodiments of the present invention may include a bottom-surface reflective portion; a plurality of peripheral-surface reflective portions disposed at an incline from a periphery of the bottom-surface reflective portion; and a fold disposed in a predetermined position on the reflective member at a predetermined position in a direction orthogonal to a surface of the bottom-surface reflective portion.

BRIEF DESCRIPTIONS OF THE DRAWINGS

DETAILED DESCRIPTION OF EMBODIMENTS

Embodiments of the present invention will be described below based on the drawings.

First Example

A television device 100 according to one or more embodiments of a first example of the present invention will be described with reference to FIGS. 1 to 5. The television device 100 is an example of the "display device" of one or more embodiments of the present invention.

Figure 1:
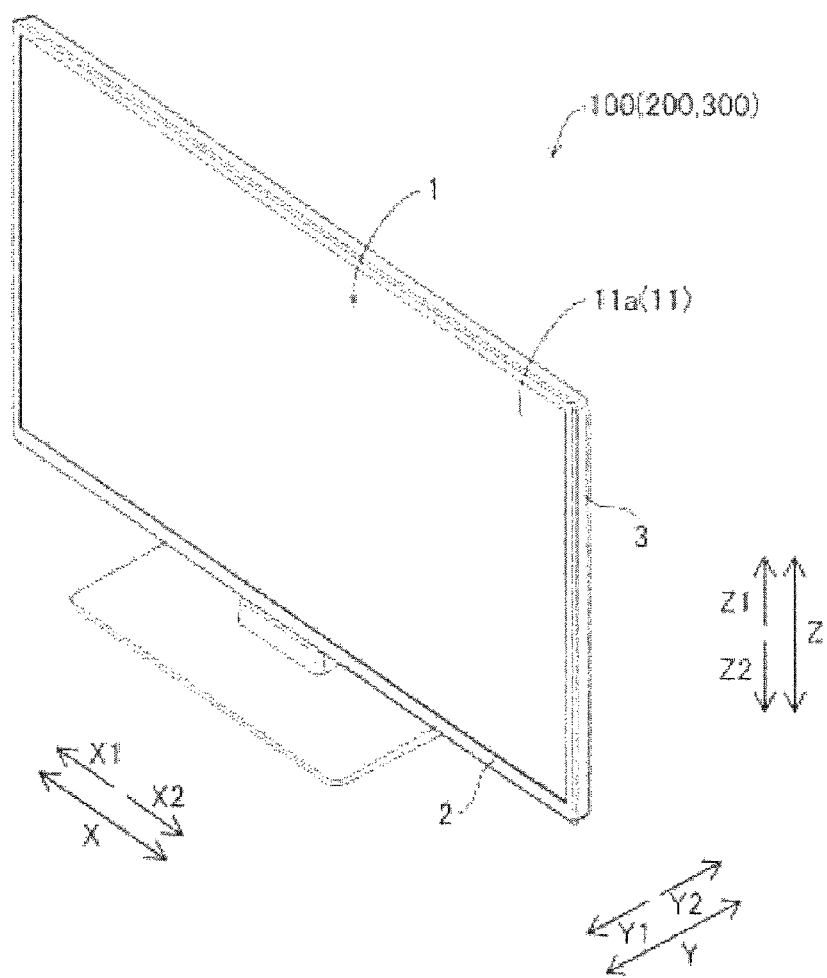
FIG. 1 shows an overall perspective view of a television device according to one or more embodiments of first to third examples of the present invention viewed from the front.

As illustrated in FIG. 1, the television device 100 according to one or more embodiments of the first example of the present invention includes a display module 1, a front cabinet 2 (front-side casing) that houses the display module 1, and a rear cabinet 3 (rear-side casing).

Figure 2:
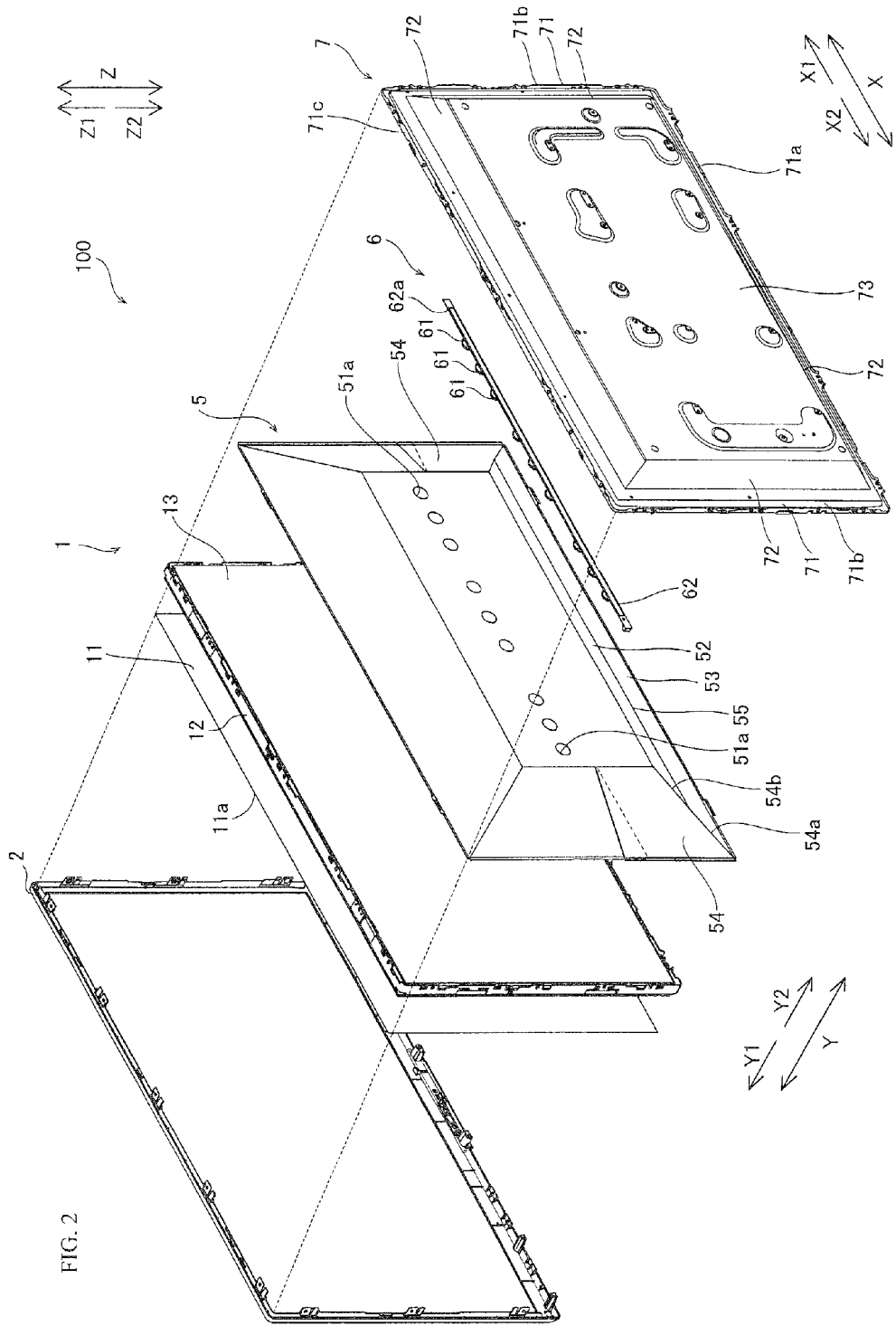
FIG. 2 shows an exploded perspective view of the television device according to one or more embodiments of the first example of the present invention viewed from the rear.

As illustrated in FIG. 2, the display module 1 includes a liquid crystal cell 11 that has a display surface 11a on a front surface, a mold frame 12 that holds the liquid crystal cell 11, various types of optical sheets 13, a reflective sheet 5 (reflective member), a light source unit 6, and a rear frame 7. The front cabinet 2 covers a peripheral portion of the display module 1 from a front-surface side and is fixed to the rear frame 7. The rear cabinet 3 (see FIG. 1) covers a back-surface side of the display module 1 (rear frame 7) and is fixed to the rear frame 7. The liquid crystal cell 11 is an example of the "display unit" of one or more embodiments of the present invention. Illustration of the rear cabinet 3 is omitted in FIG. 2. Hereinbelow, a display-surface 11a side of the television device 100 will be defined as forward (Y1 direction), a reverse direction of forward will be described as rearward (Y2 direction), and a direction along forward and rearward as a front and rear direction (Y direction). A direction orthogonal to the front and rear direction (Y direction) and an up and down direction (Z direction) will be defined as a horizontal direction (X direction).

The liquid crystal cell 11 of the display module 1 is held on a front-surface side of the mold frame 12. The mold frame 12 is a frame-shaped member made of a resin and, in addition to the liquid crystal cell 11, holds the optical sheets 13 on a back-surface side. The mold frame 12 is disposed on an inner side of the front cabinet 2. The optical sheet 13 is a diffusion plate or another functional sheet and is provided in a plurality.

Figure 3:
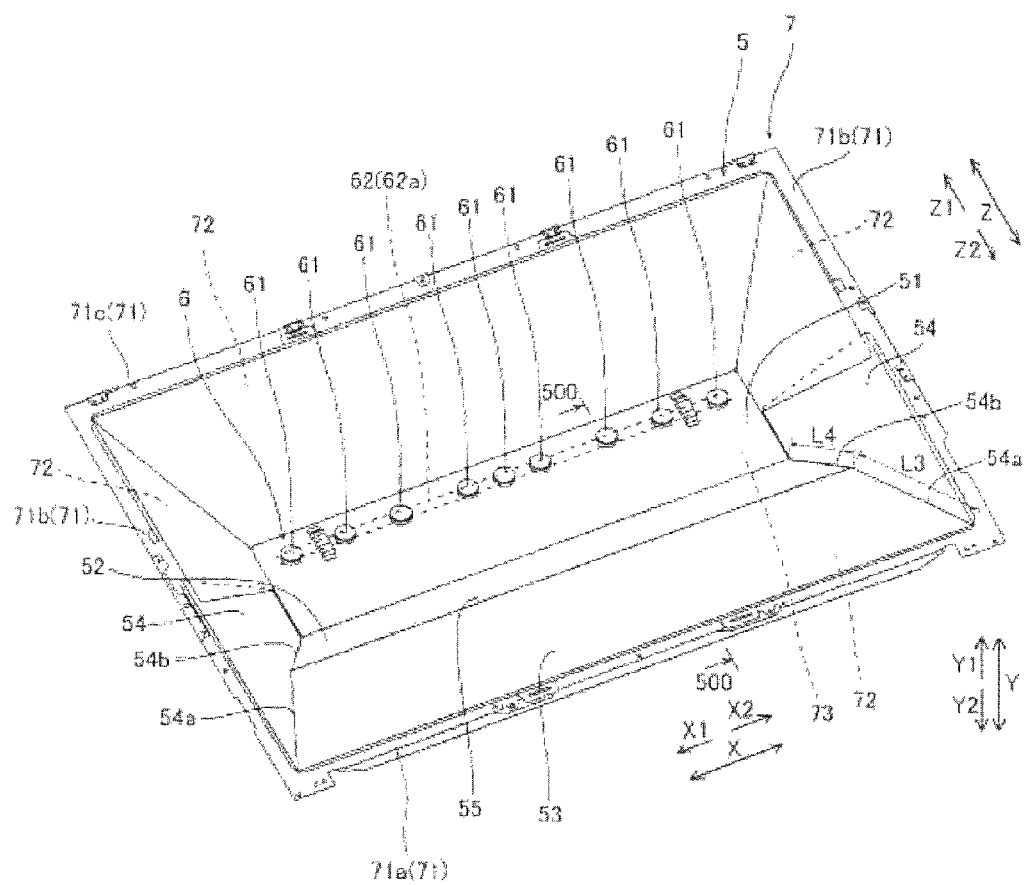
FIG. 3 shows a perspective view of a reflective sheet, a light source unit, and a rear frame of the television device according to one or more embodiments of the first example of the present invention.

As illustrated in FIG. 3, the rear frame 7 is made of sheet metal, disposed rearward (Y2 direction) of the reflective sheet 5, has a concave shape, and is configured to house the light source unit 6 (an LED 61 that will be described below) and the reflective sheet 5 on an inner side. The rear frame 7 is formed to cover the display module 1 (see FIG. 2) from the rear (Y2 direction).

Figure 4:
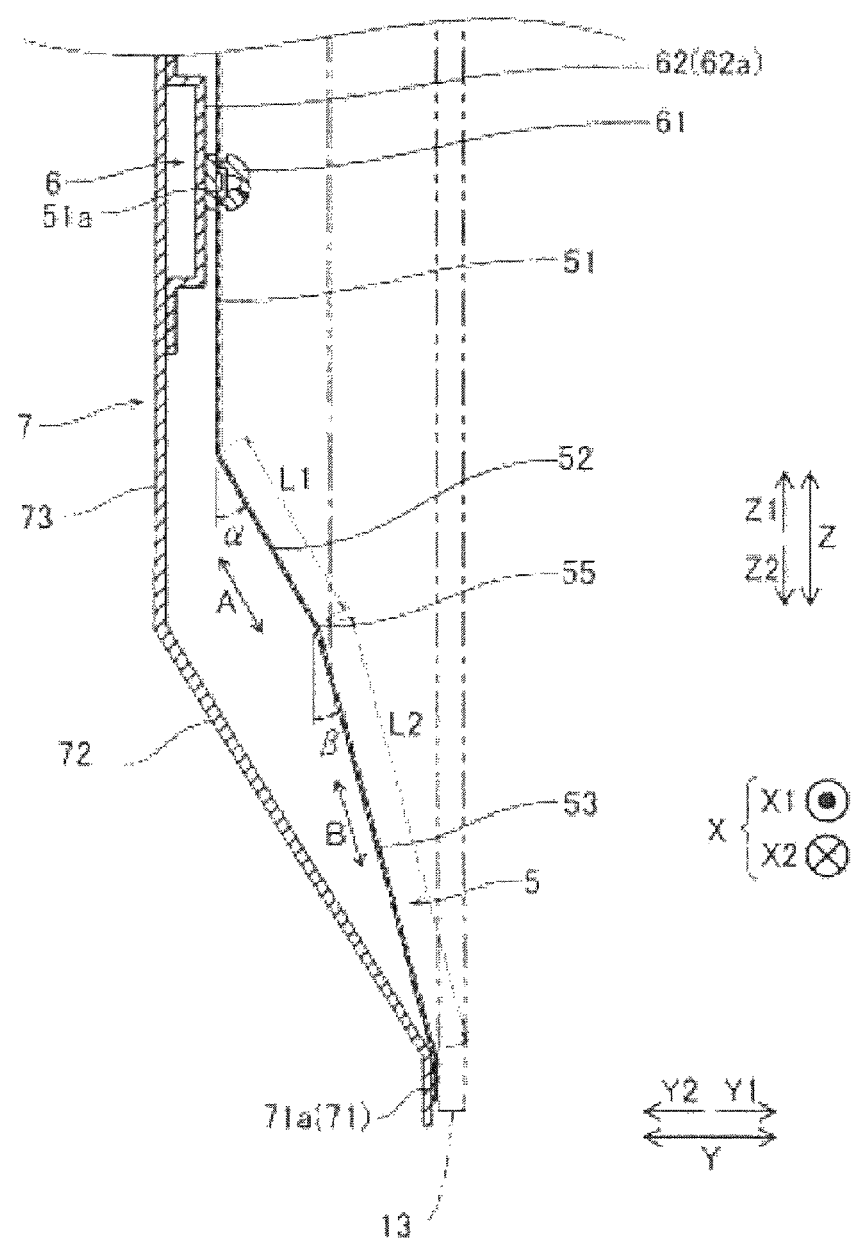
FIG. 4 shows a schematic cross-sectional view at line 500-500 in FIG. 3 according to one or more embodiments of the present invention.

Furthermore, as illustrated in FIG. 2, the rear frame 7 includes an edge portion 71 of a rectangular shape disposed on a forward side, four side plate portions 72 that are connected to each side of the edge portion 71 and extend inclined rearward (Y2 direction), and a bottom plate portion 73 of a rectangular shape connected to the four side plate portions 72 on a rearward side. By this edge portion 71, the rear frame 7 is formed to be a rectangular shape when viewed from the front and rear direction (Y direction). As illustrated in FIG. 4, the reflective sheet 5 is disposed in an abutted state on a front-surface side of the edge portion 71 in the rear frame 7. The optical sheets 13 are disposed on the rear frame 7 on a forward side of the edge portion 71 via the reflective sheet 5.

Furthermore, as illustrated in FIG. 3, the edge portion 71 of the rear frame 7 is configured from a lower-side edge portion 71a that is downward (Z2 direction), a pair of horizontal-side edge portions 71b in the horizontal direction (X1 direction and X2 direction) adjacent to the lower-side edge portion 71a, and an upper-side edge portion 71c that is upward (Z1 direction) and adjacent to the horizontal-side edge portions 71b. The light source unit 6 is installed and fixed on a front-surface side of the bottom plate portion 73. The front cabinet 2 (see FIG. 1), the rear cabinet 3 (see FIG. 1), a circuit board (not illustrated) including a tuner unit (not illustrated), and the like are installed and fixed on a back-surface side of the bottom plate portion 73. The lower-side edge portion 71a is an example of the "first edge portion" of one or more embodiments of the present invention. The horizontal-side edge portion 71b is an example of the "second edge portion" of one or more embodiments of the present invention. The four side plate portion 72 is an example of the "fourth inclined portion" of one or more embodiments of the present invention.

The light source unit 6 includes a plurality of LEDs 61 and an LED substrate 62 (see FIG. 2) to which the plurality of LEDs 61 is installed. For example, the LED substrate 62 has a flat plate shape extending in the horizontal direction (X direction). The LED substrate 62 has a mounting surface 62a on which the plurality of LEDs 61 is mounted to line up in one row in the horizontal direction (X direction). The television device 100 (see FIG. 1) is a liquid crystal television device of a so-called direct-type lighting type where the light source unit 6 is disposed on a back-surface side of the liquid crystal cell 11 (see FIG. 2). The LEDs 61 are an example of the "light source" of one or more embodiments of the present invention.

Figure 5:
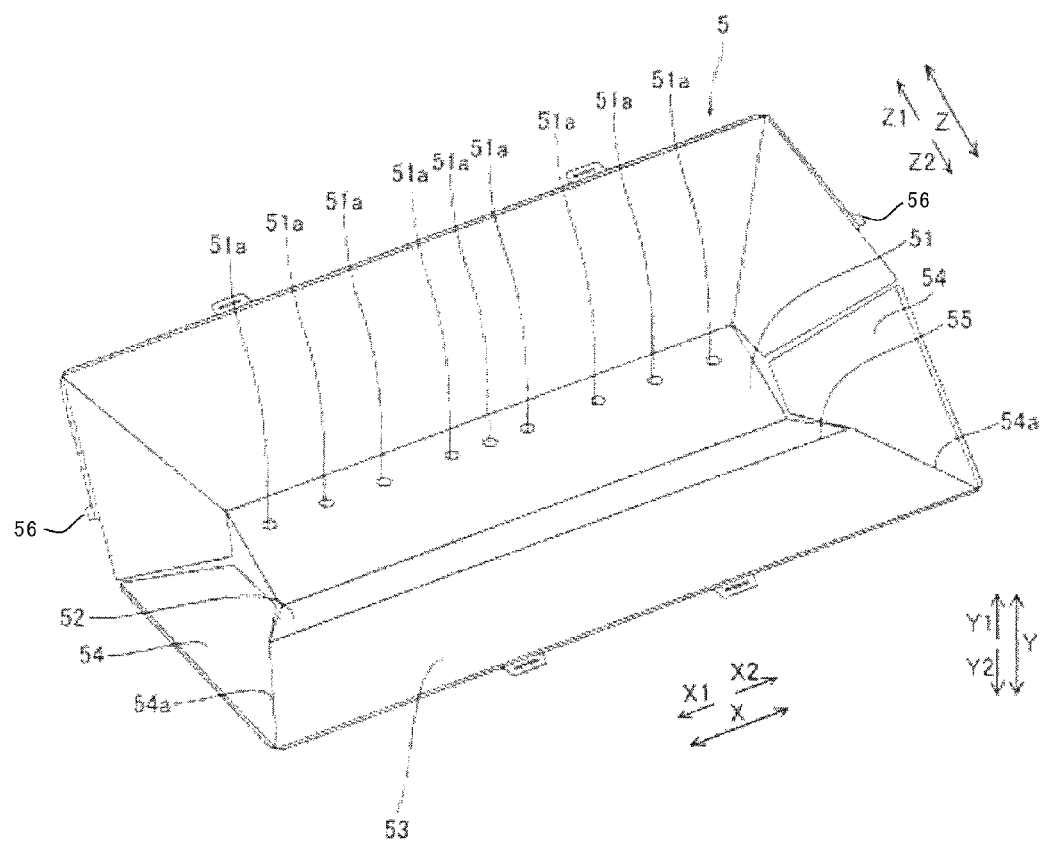
FIG. 5 shows a perspective view of the reflective sheet of the television device according to one or more embodiments of the first example of the present invention.

As illustrated in FIG. 5, the reflective sheet 5 is formed from one sheet of a sheet material. The reflective sheet 5 is formed by notching and bending into a predetermined shape that may be installed to the rear frame 7.

Furthermore, as illustrated in FIG. 4, the reflective sheet 5 is disposed on a back-surface side of the optical sheets 13 and reflects a light from the light source unit 6 (LEDs 61) forward (Y1 direction) of a liquid-crystal-cell 11 side. The reflective sheet 5 is disposed between the edge portion 71 of the rear frame 7 and the optical sheets 13. The reflective sheet 5 includes a bottom portion 51 (bottom-surface reflective portion) disposed parallel to the bottom plate portion 73 of the rear frame 7, and a plurality of inclined portions inclined relative to the bottom portion 51. The plurality of inclined portions (peripheral-surface reflective portions) include a first inclined portion 52, a second inclined portion 53, and a third inclined portion 54 (see FIG. 3). The first inclined portion 52 and the second inclined portion 53 are disposed near the lower-side edge portion 71a (lower-side-edge-portion 71a side) of the rear frame 7. Two third inclined portions 54 are respectively disposed near the pair of horizontal-side edge portions 71b (horizontal-side-edge-portion 71b side) of the rear frame 7. Y direction is a direction orthogonal to a surface of the bottom portion 51. The inclined portion may include the four side plate portion 72 disposed adjacent to the third inclined portion 54 in a lateral direction of the inclined portion, and the third inclined portion 54 and the four side plate portion 72 may be separated. Furthermore, the first inclined portion 52 and the second inclined portion 53 may be disposed on the longitudinal side of the display device 1 and the third inclined portion 54 and the four side plate portion 72 may be disposed on a lateral side of the display device 1.

Furthermore, the reflective sheet 5 is formed in a shape that tapers from the front (optical-sheet 13 side) to the rear (bottom-portion 51 side) by the first inclined portion 52 and the second inclined portion 53 in a state of being housed by the rear frame 7 (installed state).

As illustrated in FIG. 5, the bottom portion 51 of the reflective sheet 5 is formed in a rectangular shape. The bottom portion 51 has an opening 51a in each position corresponding to the plurality of LEDs 61 (see FIG. 4) mounted on the LED substrate 62 (see FIG. 4). As illustrated in FIG. 4, the reflective sheet 5 has the LED substrate 62 disposed on the back-surface side and is configured so the individual LEDs 61 are disposed on the front-surface side by passing through the openings 51a of the bottom portion 51.

The first inclined portion 52 of the reflective sheet 5 is disposed downward (Z2 direction) of the LEDs 61. The first inclined portion 52 is disposed on an inner side (bottom-portion 51 side, Z1-direction side) that is an LED 61 side relative to the second inclined portion 53. The first inclined portion 52 is formed in a flat-surface shape. The first inclined portion 52 is connected to a lower end of the bottom portion 51 and, as illustrated in FIG. 4, configured to rise forward (Y1 direction) at an angle α (angle formed with the bottom portion 51) from the lower end. That is, the first inclined portion 52 is configured to incline toward the front (Y1 direction) as it heads downward (Z2 direction) from the lower end of the bottom portion 51. The first inclined portion 52 is formed to extend in the horizontal direction (X direction) orthogonal to an inclination direction (A direction) inclined relative to the bottom portion 51. For example, the first inclined portion 52 may be trapezoidal, and an upper base of the first inclined portion 52 may be connected to the bottom portion 51 periphery.

The second inclined portion 53 of the reflective sheet 5 is disposed downward (Z2 direction) of the LEDs 61. The second inclined portion 53 is disposed on an outer side (lower-side-edge-portion 71a side, Z2-direction side) relative to the first inclined portion 52. The first inclined portion 52 is formed in a flat-surface shape. The second inclined portion 53 is connected to a lower end of the first inclined portion 52 and configured to rise forward (Y1 direction) at an angle β (angle formed with the bottom portion 51) from the lower end. That is, the second inclined portion 53 is configured to move downward (Z2 direction) as it heads forward (Y1 direction) from the lower end of the first inclined portion 52. The second inclined portion 53 is formed to extend in the horizontal direction (X direction) orthogonal to an inclination direction (B direction) inclined relative to the bottom portion 51. For example, the second inclined portion 53 may be trapezoidal, and an upper base of the second inclined portion 53 may be connected to a lower base of the first inclined portion 52.

Furthermore, the reflective sheet 5 is configured so the angle α of the first inclined portion 52 rising from the LED 61 side (bottom-portion 51 side) is greater than the angle β of the second inclined portion 53 rising from the LED 61 side (bottom-portion 51 side). For example, the angle α may be set to 30 degrees, and the angle β may be set to 20 degrees. The angle α may be set within a predetermined angle range so concerning the light from the LEDs 61, a light in a direction orthogonal to the optical sheets 13 decreases. For example, the angle β may be set within 14 degrees to 25 degrees. Furthermore, the angle β may be set within 16 degrees to 18 degrees. Furthermore, the reflective sheet 5 includes protrusions 56. For example, operators hold the protrusions 56 to dispose the reflective sheet 5 in the chassis. By this, the operators holding the reflective surface are prevented from soiling the reflective surface and generating brightness unevenness.

Figure 6:
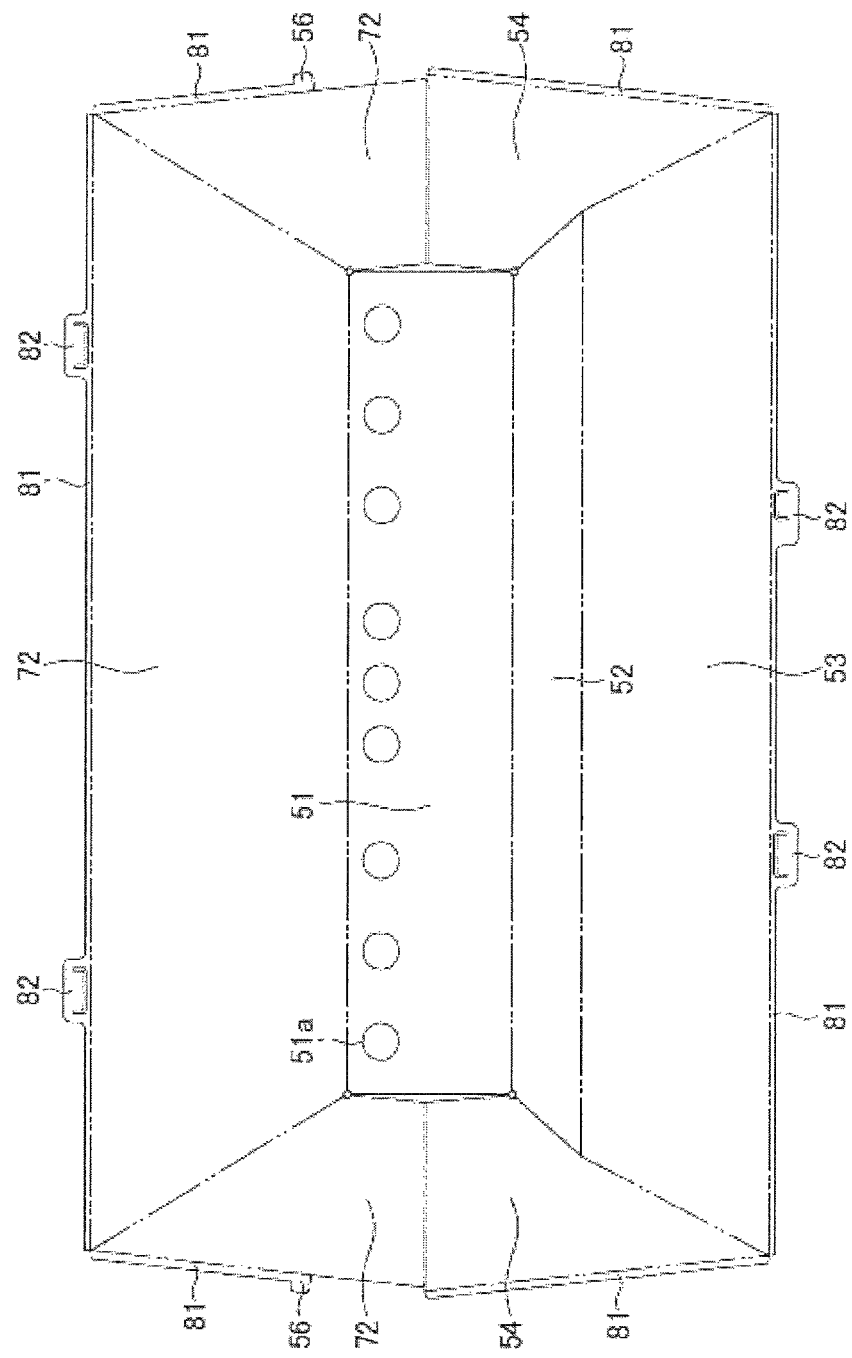
FIG. 6 shows a developed view of the reflective sheet of the television device according to one or more embodiments of the first example of the present invention.

As illustrated in FIG. 6, an extension portion 81 is disposed on the edge portion 71. An engaging portion 82 engages a mounting portion formed in the edge portion 71.

Furthermore, as illustrated in FIG. 3, the reflective sheet 5 is configured so a length L1 in the inclination direction (A direction) of the first inclined portion 52 is smaller than a length L2 in the inclination direction (B direction) of the second inclined portion 53 in a side view (when viewed from the X direction).

The first inclined portion 52 and the second inclined portion 53 are connected by a fold 55 of a mountain shape facing forward (Y1 direction). That is, the fold 55 is formed at a boundary between the first inclined portion 52 and the second inclined portion 53. The fold 55 is formed to extend in a longitudinal direction (X direction) of the liquid crystal cell 11. Longitudinal directions (X directions) of the reflective sheet 5, the first inclined portion 52, and the second inclined portion 53 are the same direction as the longitudinal direction (X direction) of the liquid crystal cell 11.

Furthermore, the fold 55 is disposed on a side closer to the LEDs 61 than the optical sheets 13 in the front and rear direction (Y direction). That is, the fold 55 is disposed on a side closer to the LEDs 61 than an intermediate position between the LEDs 61 and the optical sheets 13 (position illustrated by the one-dot chain line in FIG. 4) in the side view (when viewed from the X direction).

Furthermore, the reflective sheet 5 is configured so a boundary line 54a (length L3) between the third inclined portion 54 and the second inclined portion 53 is longer than a boundary line 54b (length L4) between the third inclined portion 54 and the first inclined portion 52. The reflective sheet 5 is configured so the third inclined portion 54 and the second inclined portion 53 are connected on the longer boundary line 54a (on the boundary line 54a of the length L3 between the third inclined portion 54 and the second inclined portion 53). The reflective sheet 5 is configured so the third inclined portion 54 and the first inclined portion 52 are not connected on the shorter boundary line 54b (on the boundary line 54b of the length L4 between the third inclined portion 54 and the first inclined portion 52).

In one or more embodiments of the first example, effects such as below may be obtained.

In one or more embodiments of the first example, as above, by connecting the first inclined portion 52 and the second inclined portion 53 of the reflective sheet 5 by the fold 55 that extends in the direction orthogonal to the inclination directions of each, the reflective sheet 5 becomes less likely to flex (bend) in a direction orthogonal to the direction in which the fold 55 extends due to the fold 55; therefore, deformation in the inclined portions of the reflective sheet 5 may be sufficiently suppressed. As a result, generation of brightness unevenness in the liquid crystal cell 11 may be further suppressed. By configuring the reflective sheet 5 so the angle α of the first inclined portion 52 rising from the LED 61 side is greater than the angle β of the second inclined portion 53 rising from the LED 61 side, the first inclined portion 52 rises at a greater (steeper) angle α than the second inclined portion 53 via the fold 55; therefore, a light amount arriving on the liquid-crystal-cell 11 side near the edge portion 71 of the rear frame 7 may be reduced compared to a situation of being flat overall where the first inclined portion 52 is made to be the same angle as the second inclined portion 53 or a situation of a nearly-flat curved shape overall. As a result, generation of a bright line near the edge portion of the liquid crystal cell 11 may be suppressed.

Furthermore, in one or more embodiments of the first example, as above, the reflective sheet 5 is configured so the length L1 in the inclination direction (A direction) of the first inclined portion 52 is smaller than the length L2 in the inclination direction (B direction) of the second inclined portion 53. Thus, a distance between the first inclined portion 52 and the edge portion of the liquid crystal cell 11 may be made large; therefore, it becomes less likely for a light reflected at the first inclined portion 52 to reach the vicinity of the edge portion of the liquid crystal cell 11. As a result, generation of the bright line near the edge portion of the liquid crystal cell 11 may be further suppressed.

Furthermore, in one or more embodiments of the first example, as above, the optical sheet 13 is disposed forward of the LEDs 61 and the reflective sheet 5, and the fold 55 is disposed on the side closer to the LEDs 61 than the optical sheets 13 in the front and rear direction. Thus, a distance in the front and rear direction between the first inclined portion 52 and the optical sheets 13 may be made large; therefore, it becomes less likely for the light reflected at the first inclined portion 52 to reach a vicinity of an edge portion of the optical sheets 13 (liquid crystal cell 11). As a result, generation of the bright line near the edge portion of the liquid crystal cell 11 may be further suppressed.

Furthermore, in one or more embodiments of the first example, as above, the longitudinal directions of the reflective sheet, the first inclined portion, and the second inclined portion are made to be the same direction as the longitudinal direction of the display unit, and the fold 55 at the boundary between the first inclined portion 52 and the second inclined portion 53 is formed to extend along the longitudinal direction of the liquid crystal cell 11. By this, a rigidity of the first inclined portion 52 and the second inclined portion 53 in the longitudinal direction, in which flexure deformation is particularly likely to arise due to an influence of thermal expansion or the like, may be heightened; therefore, flexure deformation of the first inclined portion 52 and the second inclined portion 53 may be further suppressed.

Furthermore, in one or more embodiments of the first example, as above, both the first inclined portion 52 and the second inclined portion 53 are formed in the flat-surface shape. By this, the first inclined portion 52 is formed in the flat-surface shape; therefore, a reflection direction and amount of the light may be easily adjusted (controlled at a designing step) by changing the rising angle α and a position of the first inclined portion 52 relative to the LEDs 61.

Furthermore, in one or more embodiments of the first example, as above, the rear frame 7 is formed in the rectangular shape when viewed from the front and rear direction and includes the lower-side edge portion 71a near which the first inclined portion 52 and the second inclined portion 53 of the reflective sheet 5 are disposed and the horizontal-side edge portion 71b adjacent to the lower-side edge portion 71a, and the reflective sheet includes the third inclined portion 54 disposed near the horizontal-side edge portion 71b and is configured so among the boundary line 54b between the first inclined portion 52 and the third inclined portion 54 and the boundary line 54a between the second inclined portion 53 and the third inclined portion 54, the longer boundary line has the third inclined portion and one from among the first inclined portion 52 and the second inclined portion 53 connected thereon, and the shorter boundary line does not have the third inclined portion 54 and the other from among the first inclined portion 52 and the second inclined portion 53 connected thereon. By this, the longer boundary line from among the boundary lines between the third inclined portion 54 and the first inclined portion 52 or the second inclined portion 53 may be connected on the boundary line with the third inclined portion 54; therefore, the third inclined portion 54 and one from among the first inclined portion 52 and the second inclined portion 53 may be connected in a wider range (longer distance). As a result, flexure arising in the reflective sheet 5 may be effectively suppressed.

Second Embodiment

Next, a television device 200 (see FIG. 1) according to embodiments of a second example will be described with reference to FIGS. 1 and 6. In one or more embodiments of the second example, unlike the first example, which forms the first inclined portion 52 of the reflective sheet 5 in the flat-surface shape, an example will be described of a first inclined portion 252 of a reflective sheet 205 formed in a convex curved shape. Configurations similar to those of one or more embodiments of the first example will be illustrated labeled with the same reference signs as those of the first example, and description thereof will be omitted. The television device 200 is an example of the "display device" of one or more embodiments of the present invention.

Figure 7:
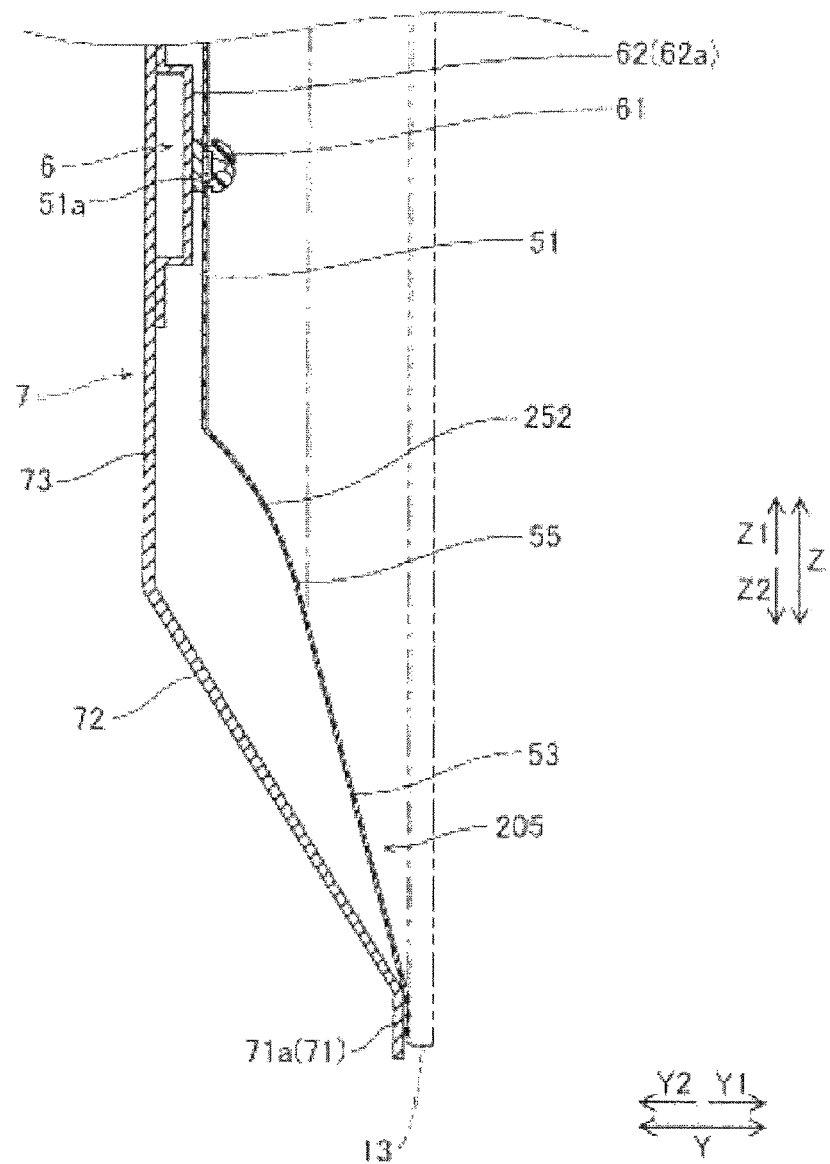
FIG. 7 shows a schematic cross-sectional view of a portion of a reflective sheet of a television device according to one or more embodiments of a second example of the present invention.

As illustrated in FIG. 7, in the television device 200 (see FIG. 1) according to one or more embodiments of the second example, the reflective sheet 205 includes the first inclined portion 252. This first inclined portion 252 is inclined in a predetermined inclination direction relative to the bottom portion 51. The first inclined portion 252 is formed in a curved shape that is forwardly (Y1 direction) convex and curves along the inclination direction. The first inclined portion 252 is formed to extend in the horizontal direction (X direction) while maintaining the curved shape in the inclination direction illustrated in FIG. 7. The reflective sheet 205 is configured to diffuse light by reflecting the light from the LEDs 61 by the first inclined portion 252 of the convex and curved shape.

Other configurations of embodiments of the second example are similar to those of embodiments of the first example.

In one or more embodiments of the second example, effects such as below may be obtained.

In one or more embodiments of the second example, similarly to one or more embodiments of the first example, by connecting the first inclined portion 252 and the second inclined portion 53 of the reflective sheet 205 by the fold 55 extending in the direction orthogonal to the inclination directions of each, generation of brightness unevenness in the liquid crystal cell 11 may be further suppressed. By configuring the reflective sheet 205 so the angle α of the first inclined portion 252 rising from the LED 61 side is greater than the angle β of the second inclined portion 53 rising from the LED 61 side, generation of the bright line near the edge portion of the liquid crystal cell 11 may be suppressed.

Furthermore, in one or more embodiments of the second example, as above, the second inclined portion 53 is formed in the flat-surface shape, and the first inclined portion 252 is formed in the curved shape that is forwardly convex and curves along the inclination direction of the first inclined portion 252. By this, a first inclined surface 252 near the LEDs 61 becomes the convex and curved shape; therefore, the light reflected at the first inclined portion 252 may be diffused, and it may be made difficult for the light to arrive near the end portion of the liquid crystal cell 11. Thus, brightness unevenness of the liquid crystal cell 11 may be suppressed, and generation of the bright line near the edge portion of the liquid crystal cell 11 may be suppressed.

Third Embodiment

Next, a television device 300 (see FIG. 1) according to embodiments of a third example will be described with reference to FIGS. 1 and 7. In one or more embodiments of the third example, unlike one or more embodiments of the second example, which forms the first inclined portion 352 of the reflective sheet 305 in the forwardly (Y1 direction) convex curved shape, an example will be described of a first inclined portion 352 of a reflective sheet 305 formed in rearwardly (Y2 direction) convex curved shape. Configurations similar to those of one or more embodiments of the second example will be illustrated labeled with the same reference signs as those of one or more embodiments of the second example, and description thereof will be omitted.

The television device 300 is an example of the "display device" of one or more embodiments of the present invention.

Figure 8:
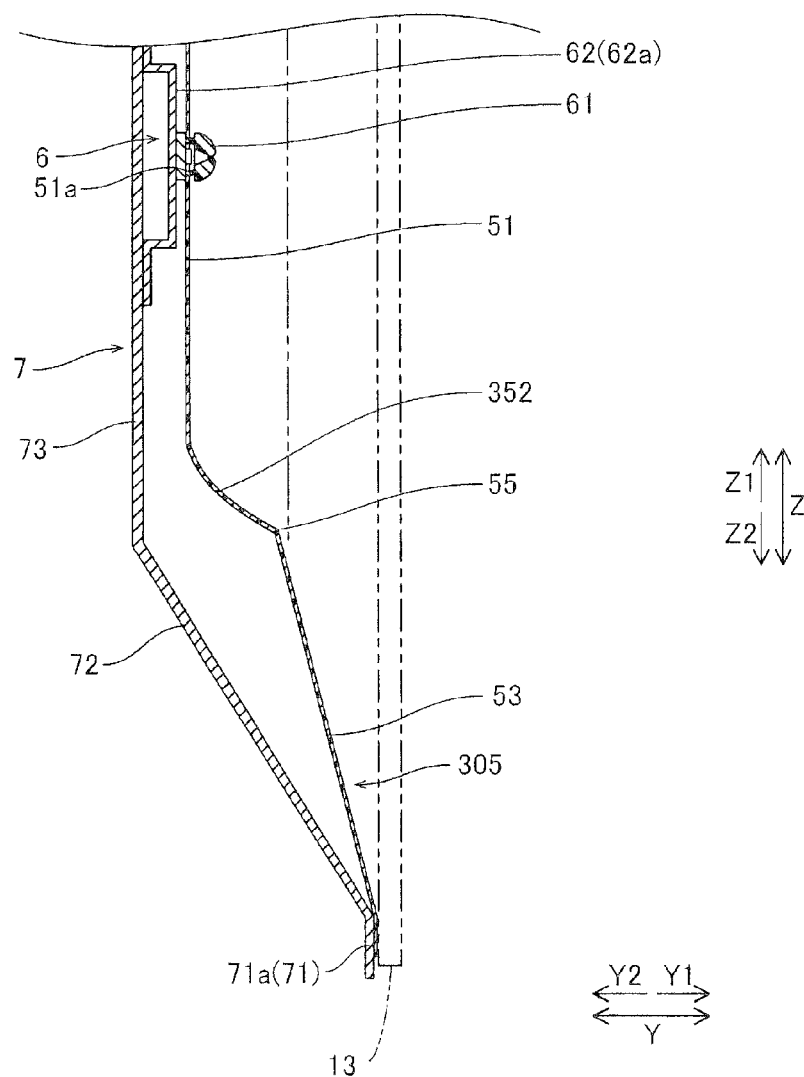
FIG. 8 shows a schematic cross-sectional view of a portion of a reflective sheet of a television device according to one or more embodiments of a third example of the present invention.

As illustrated in FIG. 8, in the television device 300 (see FIG. 1) according to one or more embodiments of the third example, the reflective sheet 305 includes the first inclined portion 352. This first inclined portion 352 is inclined in a predetermined inclination direction relative to the bottom portion 51. The first inclined portion 352 is formed in a curved shape that is rearwardly (Y2 direction) convex and curves along the inclination direction. The first inclined portion 352 is formed to extend in the horizontal direction (X direction) while maintaining the curved shape in the inclination direction illustrated in FIG. 8. The reflective sheet 305 is configured to collect light near a central portion of the optical sheets 13 by reflecting the light from the LEDs 61 by the first inclined portion 352 of the convex and curved shape.

Other configurations of one or more embodiments of the third example are similar to those of one or more embodiments of the second example.

In one or more embodiments of the third example, effects such as below may be obtained.

In one or more embodiments of the third example, similarly to one or more embodiments of the second example, by connecting the first inclined portion 352 and the second inclined portion 53 of the reflective sheet 305 by the fold 55 extending in the direction orthogonal to the inclination directions of each, generation of brightness unevenness in the liquid crystal cell 11 may be further suppressed. By configuring the reflective sheet 305 so the angle α of the first inclined portion 352 rising from the LED 61 side is greater than the angle β of the second inclined portion 53 rising from the LED 61 side, generation of the bright line near the edge portion of the liquid crystal cell 11 may be suppressed.

Furthermore, in one or more embodiments of the third example, as above, the second inclined portion 53 is formed in the flat-surface shape, and the first inclined portion 352 is formed in the curved shape that is rearwardly convex and curves along the inclination direction of the first inclined portion 352. By this, a first inclined surface 352 near the LEDs 61 becomes a concave and curved shape; therefore, the light reflected at the first inclined portion 352 may be diffused, and it may be made difficult for the light to arrive near the end portion of the liquid crystal cell 11. By this, brightness unevenness of the liquid crystal cell 11 may be suppressed, and generation of the bright line near the edge portion of the liquid crystal cell 11 may be suppressed.

Embodiments herein disclosed are examples at all points and should not be considered limiting. The scope of the present invention is indicated not by the above description of the embodiments but by the scope of patent claims and includes meanings equivalent to the scope of patent claims and all modifications within the scope.

For example, in one or more embodiments of the first to third examples above, an example is illustrated of applying the present invention as the television device, but the present invention may be applied as a display device other than the television device.

Furthermore, in one or more embodiments of the first to third examples above, an example is illustrated of providing a first inclined portion and a second inclined portion only downward of the light source unit, but the present invention is not limited thereto. In the present invention, it is favorable to form at least any one of the inclined portions in the up and down and left and right directions in a plurality. For example, first inclined portions and second inclined portions may be provided downward and upward of the light source.

Furthermore, in one or more embodiments of the first to third examples above, an example is illustrated of providing two inclined portions, the first inclined portion and the second inclined portion, downward of the light source unit, but the present invention is not limited thereto. In the present invention, three or more inclined portions including the first inclined portion and the second inclined portion may be provided downward of the light source unit.

Furthermore, in one or more embodiments of the first to third examples above, an example is described of forming a second inclined surface in the flat-surface shape, but the present invention is not limited thereto. In one or more embodiments of the present invention, for example, the second inclined surface may be formed in a curved shape.

Furthermore, in one or more embodiments of the first to third examples above, an example is described where the size (length) in the inclination direction of the first inclined portion is smaller than the size (length) in the inclination direction of the second inclined portion, but the present invention is not limited thereto. In the present invention, the size in the inclination direction of the first inclined portion may be greater than the size in the inclination direction of the second inclined portion.

Furthermore, in one or more embodiments of the first to third examples above, an example is described of disposing the fold on the side closer to the light source than the optical sheet, but the present invention is not limited thereto. In one or more embodiments of the present invention, the fold may be disposed on a side closer to the optical sheet than the light source.

EXPLANATION OF REFERENCES 5, 205, 305 Reflective sheet
7 Rear frame
11 Liquid crystal cell
13 Optical sheet
52, 252, 352 First inclined portion
53 Second inclined portion
54 Third inclined portion
54a Boundary line
54b Boundary line
55 Fold
61 LED (light source)
71a Lower-side edge portion (first edge portion)
71b Horizontal-side edge portion (second edge portion)
72 Four side plate portion
100, 200, 300 Television device (display device)

What is claimed is:
1. A display device comprising:
 a display unit:
 a reflective sheet comprising:
  a bottom portion;
  a first inclined portion extending from the bottom portion; and
  a second inclined portion extending from the first inclined portion;
 an optical sheet disposed between the display unit and the reflective sheet; and
 a rear frame,
 wherein an end of the reflective sheet is extended from the second inclined portion and is sandwiched between the optical sheet and the rear frame, and wherein a first acute angle between a plane parallel to the bottom portion and the first inclined portion is greater than a second acute angle between the plane and the second inclined portion.

2. The display device according to claim 1, wherein the reflective sheet further comprises:
   a fold disposed between the first inclined portion and the second inclined portion.

3. The display device according to claim 2, wherein the first inclined portion is trapezoidal, and
   an upper base of the first inclined portion is connected to a bottom portion periphery.

4. The display device according to claim 2, wherein the second inclined portion is trapezoidal, and
   an upper base of the second inclined portion is connected to a lower base of the first inclined portion.

5. The display device according to claim 2, wherein a length in an inclination direction of the first inclined portion is smaller than a length in an inclination direction of the second inclined portion.

6. The display device according to claim 2, wherein
   longitudinal directions of the bottom portion, the first inclined portion, and the second inclined portion are the same direction, and
   the fold extends along the longitudinal direction of the bottom portion.

7. The display device according to claim 2, wherein both the first inclined portion and the second inclined portion have a flat-surface shape.

8. The display device according to claim 2, wherein the first inclined portion has a curved shape curving along an inclination direction of the first inclined portion.

9. The display device according to claim 2, wherein the reflective sheet further comprises a third inclined portion adjacent to the first inclined portion and the second inclined portion.

10. The display device according to claim 9, wherein the third inclined portion is connected to the second inclined portion and separated from the first inclined portion.

11. The display device according to claim 9, wherein the third inclined portion is connected to the first inclined portion and separated from the second inclined portion.

12. The display device according to claim 9, wherein the reflective sheet further comprises a fourth inclined portion disposed adjacent to the third inclined portion in a lateral direction of the inclined portion, and the third inclined portion and the fourth inclined portion are separated.

13. The display device according to claim 1, wherein the second acute angle is in a range of 14 to 25 degrees.

14. The display device according to claim 1, wherein the second acute angle is in a range of 16 to 18 degrees.

15. A display device, comprising:
   a display unit;
   a reflective sheet comprising:
      a bottom portion;
      a first inclined portion extending from the bottom portion; and
      a second inclined portion extending from the first inclined portion;
   a plurality of light sources disposed to line up in a predetermined direction on the bottom portion,
   wherein a fold disposed between the first inclined portion and the second inclined portion is extended in the predetermined direction.

16. The display device according to claim 15, wherein the plurality of light sources are disposed farther than a central portion of the bottom portion relative to the first inclined portion.

17. The display device according to claim 15, further comprising: an optical sheet disposed between the display unit and the reflective sheet, wherein
   the fold is disposed nearer to the plurality of light sources than the optical sheet in a direction orthogonal to a surface of the bottom portion.

* * * * *